United States Patent
Ingino et al.

(10) Patent No.: US 9,201,441 B2
(45) Date of Patent: Dec. 1, 2015

(54) DC/DC CONVERTER WITH SHUNT CIRCUITRY

(71) Applicant: Fairchild Semiconductor Corporation, San Jose, CA (US)

(72) Inventors: Joseph M. Ingino, Libertyville, IL (US); Poojan Wagh, Sleepy Hollow, IL (US)

(73) Assignee: Fairchild Semiconductor Corporation, San Jose, CA (US)

( * ) Notice: Subject to any disclaimer, the term of this patent is extended or adjusted under 35 U.S.C. 154(b) by 122 days.

(21) Appl. No.: 13/718,143

(22) Filed: Dec. 18, 2012

(65) Prior Publication Data

US 2014/0167710 A1 Jun. 19, 2014

(51) Int. Cl.
*G05F 1/00* (2006.01)
*G05F 3/08* (2006.01)
*G05F 1/565* (2006.01)

(52) U.S. Cl.
CPC . *G05F 3/08* (2013.01); *G05F 1/565* (2013.01)

(58) Field of Classification Search
CPC ............ G05F 1/10; G05F 1/44; G05F 1/455; G05F 1/46; G05F 1/565
USPC ......... 323/220, 223, 234, 237, 265, 282, 283, 323/284, 285
See application file for complete search history.

(56) References Cited

U.S. PATENT DOCUMENTS

| | | | |
|---|---|---|---|
| 6,191,567 B1* | 2/2001 | Sluijs | 323/259 |
| 2003/0016000 A1* | 1/2003 | Sanchez | 323/284 |
| 2004/0145923 A1* | 7/2004 | Van Bodegraven et al. | 363/20 |
| 2005/0127881 A1* | 6/2005 | Sase et al. | 323/225 |
| 2008/0054861 A1* | 3/2008 | Zlatkovic | 323/234 |
| 2009/0189578 A1* | 7/2009 | Chen et al. | 323/282 |
| 2009/0323375 A1* | 12/2009 | Galvano et al. | 363/21.06 |
| 2012/0326691 A1* | 12/2012 | Kuan et al. | 323/299 |

OTHER PUBLICATIONS

Texas Instruments—LM3243 Product Brief—High-Current Step-Down Converter for 2G/3G/4G RF Power Amplifiers, Feb. 24, 2012, 5 pages.

* cited by examiner

*Primary Examiner* — Jeffrey Gblende
(74) *Attorney, Agent, or Firm* — Grossman Tucker Perreault & Pfleger PLLC

(57) ABSTRACT

The present disclosure provides, in one embodiment, a method of shunting a power supply to reduce output ripple. The method includes determining at least one performance parameter of a DC/DC converter circuit; generating a first reference signal, wherein the first reference signal is based on the performance parameter; comparing the first reference signal to the performance parameter; and generating a shunt current from an input power source to an output node of the DC/DC converter circuit based on, at least in part, the comparison of the performance parameter and the first reference signal.

17 Claims, 3 Drawing Sheets

DC/DC CONVERTER WITH SHUNT CIRCUITRY

FIELD

The present disclosure relates to DC/DC converter topologies, and, more particularly, to DC/DC converter topologies that include shunt circuitry.

BACKGROUND

A variety of applications, such as RF applications, are sensitive to output ripple caused by inductive DC/DC converter power supplies. The switching frequency in most DC/DC converters will decrease as the DC/DC converter is forced to operate above a maximum duty cycle. Decreasing the switching frequency results in increased output ripple voltage, which is usually caused by an increase in ripple current. The duty cycle increase of the DC/DC converter is caused by a decrease in supply voltage and/or an increase in load current. Conventional approaches to attempt to solve these problems include the use of a low-drop-out (LDO)-type circuit. An LDO circuit outputs a current to a load in proportion to its input yet dissipating considerable power in the process.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Figure 1:
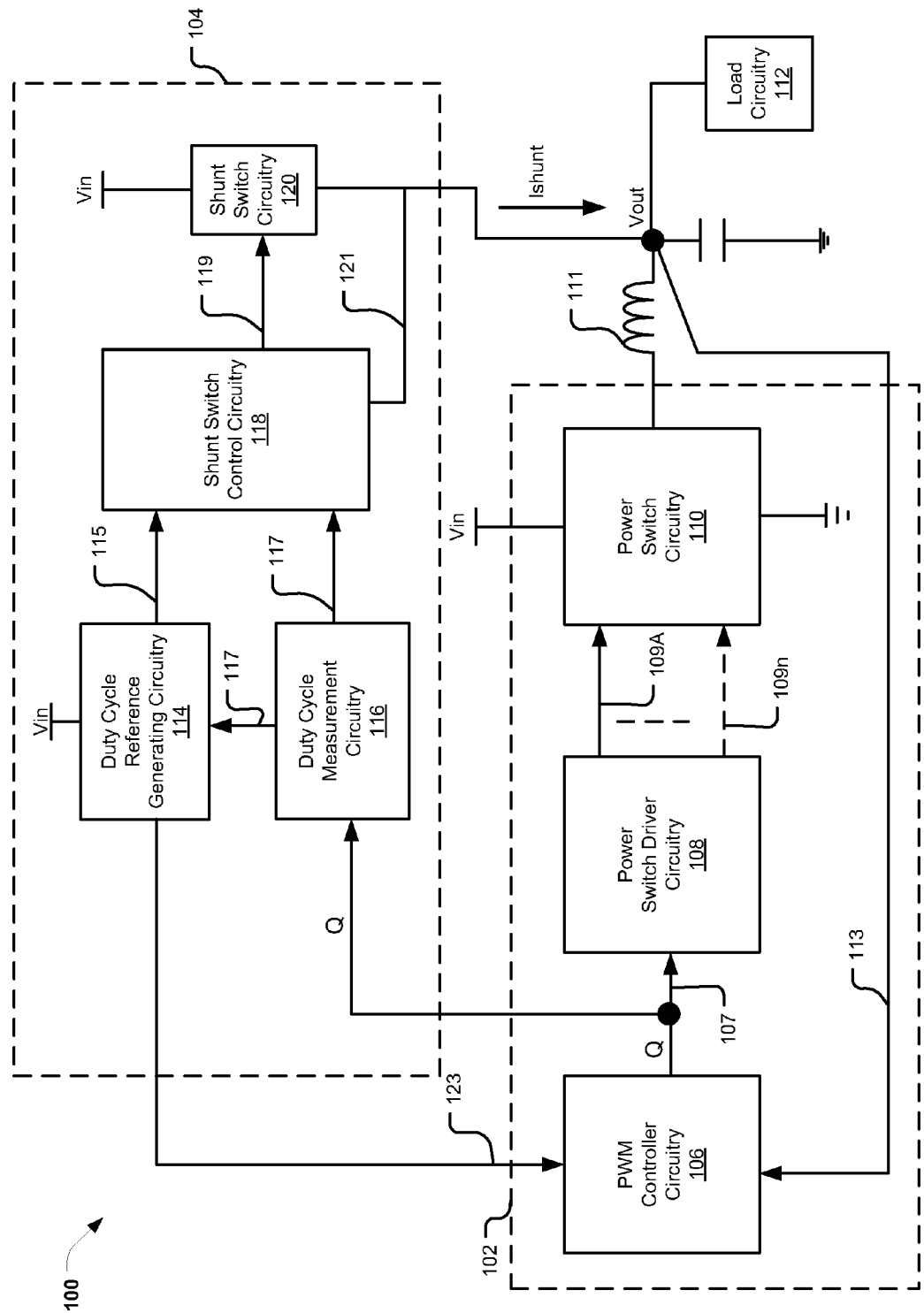
FIG. 1 illustrates a power supply system consistent with various embodiments of the present disclosure.

FIG. 1 illustrates a power supply system 100 consistent with various embodiments of the present disclosure. The power supply system 100 depicted in FIG. 1 may be included with, or form part of, a general-purpose or custom integrated circuit (IC) such as a semiconductor integrated circuit chip, system on chip (SoC), etc. The power supply system 100 generally includes DC/DC converter circuitry 102 configured to supply power load circuitry 112. The DC/DC converter circuitry 102 may include various known switched converter topologies such as Buck, Boost, Buck-Boost, SEPIC, Flyback, Class B, etc., and/or other known or after-developed DC/DC converter topologies, and is generally configure to receive an input voltage, Vin, and generate an output voltage, Vout, to supply power to load circuitry 112. The DC/DC converter circuitry 102 is coupled to inductor circuitry 111 and output capacitor circuitry C. The operation of the DC/DC converter circuitry 102 operates to energize the inductor circuitry 111 to controllably deliver power to the load circuitry 112, as is well known. In the example of FIG. 1, the DC/DC converter circuitry 102 includes pulse width modulation (PWM) controller circuitry 106, power switch driver circuitry 108, power switch circuitry 110 and inductor circuitry 114. The PWM controller circuitry 106 is configured to generate a PWM signal Q (107) having a controllable duty cycle. The power switch driver circuitry 108 is configured to condition Q to generate at least one PWM switch control signal 109A, . . . , 109n. The power switch circuitry 110 includes at least one power switch device (e.g., PMOS, NMOS, SiC, BJT, etc.) that is controlled to switch Vin to charge the inductor 111. For example, in a two switch Buck converter, the power switch circuitry may include a "high side" switch and a "low side" switch coupled in series between Vin and ground (or other reference potential). In this example, the power switch driver circuitry may be configured to generate a PWM control signal 109A to control the "high side" switch and a complimentary PWM control signal 109B to control the "low side" switch. As is well known, the power switch control circuitry 110 is controlled by Q to controllably energize the inductor L to generate power at the Vout node and to the load circuitry 112 coupled thereto. The PWM controller circuitry 106 is also configured to receive a feedback signal 113 from the output node (Vout). The feedback signal 113 is indicative of load conditions (load demand) of the load circuitry 112 coupled to the Vout node. The PWM controller circuitry 106 is also configured to adjust the duty cycle of the PWM signal 107 based on, at least in part, the feedback signal 113.

As the duty cycle of the PWM signal 107 increases, an increase in ripple voltage may be observed at the output node Vout. Such an increased ripple voltage my exceed tolerable limits of the load circuitry 112, and thus, the DC/DC converter circuitry 102 may not be capable of properly supplying power to the load circuitry under a variety of changing conditions. Accordingly, the power supply system 100 of the present disclosure also includes shunt circuitry 104 coupled to the output node (Vout) and generally configured to provide a shunt current, Ishunt, to the load circuitry 112 to reduce or eliminate the ripple effects caused by increased duty cycle of the PWM signal 107, increased load current demand, decreased input voltage, decreased switching frequency, etc. The shunt circuitry 104 is generally coupled to the output of the inductor circuitry 111, i.e., so that the shunt current can be delivered to the load circuitry 112 while bypassing the DC/DC converter circuitry 102 and the inductor circuitry 111. Shunt circuitry 104 is configured to generate the shunt current based on at least one performance parameter (e.g., ripple, current, duty cycle, etc.) that may affect the efficiency or operation of the load circuitry 112 when the DC/DC converter circuitry 102 supplies power to the load circuitry 112. The shunt current may be used to provide additional power to the load circuitry 112, thus reducing the IR drop effects of the DC/DC converter circuitry 102. In addition, the shunt circuitry 104 is configured to control the operation, at least in part, of the DC/DC converter circuitry 102 under various conditions, as will be described below. In the examples of the present disclosure, the shunt circuitry 104 utilizes the duty cycle of the PWM signal 107 as the performance parameter to determine when the shunt circuitry 104 should start to supply the shunt current, Ishunt. In other embodiments, other performance parameters may be used, including, for example, load current demand, input voltage, switching frequency, etc., and thus, while the foregoing examples specifically use the duty cycle of the PWM signal 107 as a performance parameters, it will be understood by those skilled in the art that other performance parameters may be used as an indication of ripple at the output node.

The shunt circuitry 104 includes duty cycle measurement circuitry 116 configured to receive the PWM signal 107 and generate a duty cycle measurement signal 117 that is indicative of, or proportional to, the duty cycle of the PWM signal 107. The shunt circuitry 104 also includes reference and control circuitry 114 configured to generate at least one reference signal 115 indicative of, or proportional to, a selected duty cycle. The selected duty cycle indicated by the reference signal 115 may be a value that indicates when the duty cycle of the PWM signal 107 generated by the DC/DC converter circuitry 102 is causing, or is known to cause, unacceptable ripple at Vout, such that providing the shunt current, Ishunt, from Vin to Vout through the circuitry 104 would reduce or eliminate these ripple effects. The value of the reference signal 115 may also be based on, for example, the circuit parameters (e.g., inductor size/limitations), the ripple requirements of the load, circuit tolerances, etc. The reference and control circuitry 114 may also be configured to control the PWM controller circuitry 106 under certain circumstances. To that end, the reference and control circuitry 114 is configured to generate a PWM converter control signal 123. The PWM converter control signal 123 is configured to control the PWM controller circuitry 106 to operate at a predefined level, for example, a maximum level. For example, The PWM converter control signal 123 may cause the PWM controller 106 to generate a PWM control signal 107 having an approximate 100% duty cycle. Forcing the PWM controller 106 to operate at maximum duty cycle may operate to reduce ripple effects at Vout when increasing load demand would otherwise cause an increase in ripple at Vout.

The shunt circuitry 104 also includes shunt switch control circuitry 118 and shunt switch circuitry 120. The shunt switch circuitry 120 generally includes a controllable switch that is coupled between Vin and Vout. The conduction state of the controllable switch generally controls the amount of shunt current (Ishunt) through the circuitry 104 that is delivered to the Vout node. The shunt switch control circuitry 118 is configured to generate a switch control signal 119 to control the conduction state of the shunt switch 120 circuitry based on, at least in part, the duty cycle reference signal 115 and the duty cycle measurement signal 117 to controllably deliver the shunt current to the Vout node. In general, if the duty cycle measurement signal 117 exceeds a first threshold represented by duty cycle reference signal 115, shunt switch control circuitry is configured to generate a switch control signal 119 that causes the shunt switch circuitry to conduct so that the shunt current, Ishunt, flows from Vin to Vout. In some embodiments, the shunt current is added power generated by the DC/DC converter circuitry 102 to provide additional power to the load circuitry 112. The shunt switch circuitry 120 may be controlled by the switch control signal 119 to operate as a variable resistor, to control the amount of shunt current (Ishunt) delivered to the output node. These operations will be described in greater detail below.

Figure 2:
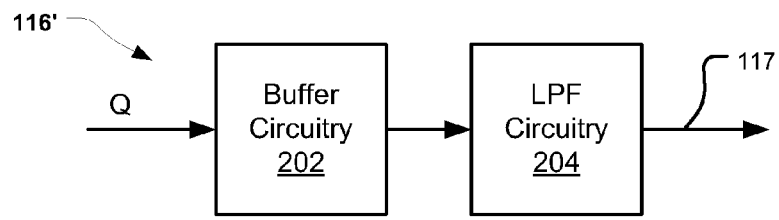
FIG. 2 illustrates duty cycle measurement circuitry according to one embodiment of the present disclosure.
Figure 3:
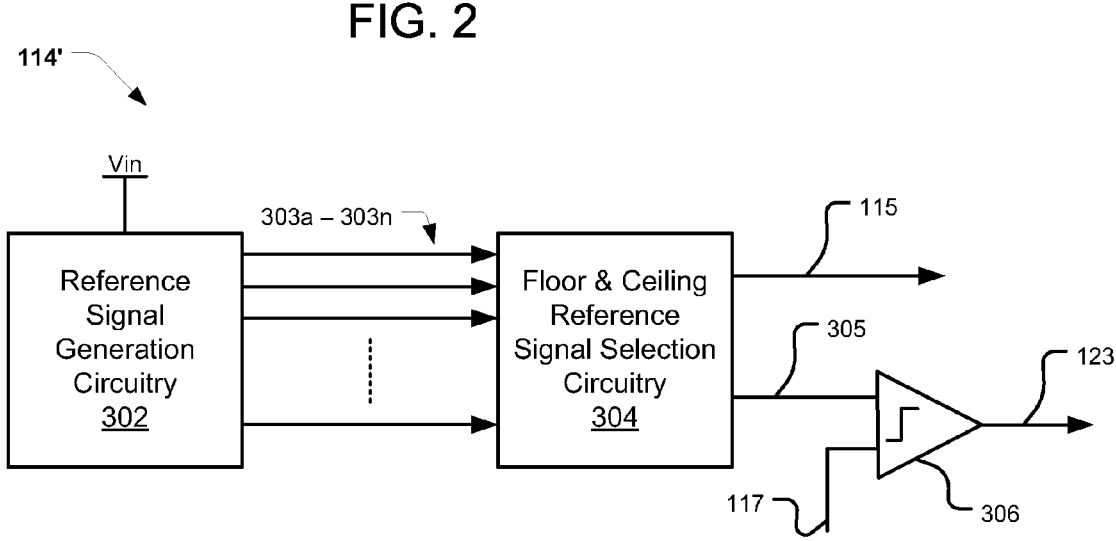
FIG. 3 illustrates reference and control circuitry according to one embodiment of the present disclosure.

FIG. 2 illustrates duty cycle measurement circuitry 116' according to one embodiment of the present disclosure. This embodiment includes buffer circuitry 202 and low pass filter (LPF) circuitry 204 configured to receive the PWM signal 107 (Q) and generate the duty cycle measurement signal 117. In this example, signal 117 is a DC signal that is proportional to the duty cycle of the PWM signal 107. FIG. 3 illustrates reference and control circuitry 114' according to one embodiment of the present disclosure. This embodiment includes reference signal generation circuitry 302 configured to generate a plurality of duty cycle reference signals 303a, ..., 303n, as a function of the input voltage Vin. The duty cycle reference signals 303a, ..., 303n may each be a DC signal that is proportional to a selected duty cycle of the PWM signal 107, and each reference signal may be generated as a function of Vin. Thus, for example, circuitry 302 may be configured to generate four reference signals 303a, 303b, 303c and 303d, where signal 303a is a DC signal that is indicative of, or proportional to, a 95% duty cycle of the PWM signal 107, signal 303b is a DC signal that is indicative of, or proportional to, a 90% duty cycle of the PWM signal 107, signal 303c is a DC signal that is indicative of, or proportional to, an 85% duty cycle of the PWM signal 107, and signal 303d is a DC signal that is indicative of, or proportional to, an 80% duty cycle of the PWM signal. Of course, this is only an example of the number of duty of cycle reference signals that may be generated, and their respective values. In general, duty cycle reference signals may be generated based on, for example, load requirements, such that at least one duty cycle reference signal has a value that is approximately equal to a duty cycle of the PWM signal 107 that may cause undesired ripple effects at the output node Vout. In one example, circuitry 302 may include a resistor ladder network (not shown), in which a plurality of resistors are serially-coupled together between Vin and a reference node (ground). In this example, the voltage drop across each resistor represents a predefined proportion of the duty cycle of the PWM signal 107. In other examples, the first and second reference signals may be user-defined and/or programmable so that the values may be set on a circuit-by-circuit basis.

The reference and control circuitry 114' may also include floor and ceiling reference signal selection circuitry 304 configured to select a first reference signal (e.g., reference signal 115) and a second reference signal (e.g., reference signal 305) among the plurality of reference signals 303a, ..., 303n generated by circuitry 302. The first selected reference signal 115 may represent a "floor" value, above which the shunt circuitry 104 is configured to start supplying the shunt current. The second reference signal 305 may represent a "ceiling" value, above which the PWM controller circuitry 106 may be forced into a maximum duty cycle state (described above). To that end, the reference and control circuitry 114' may also include comparator circuitry 306 configured to compare the second reference signal 305 to the duty cycle measurement signal 117 and generate the PWM converter control signal 123. If the duty cycle measurement signal 117 exceeds the second reference signal 305, the PWM converter control signal 123 may cause the PWM controller circuitry 106 to operate at approximately 100% duty cycle to deliver a maximum current by the DC/DC converter circuitry 102. Thus, for example, if the second reference signal 305 is selected to represent a 95% duty cycle of the PWM signal 107, when duty cycle measurement signal 117 exceeds the second reference signal 305, the comparator circuitry 306 may cause the PWM converter control signal 123 to change states (e.g., from LOW to HIGH) which, in turn, may be used to control the PWM controller circuitry 106 to operate at a maximum duty cycle (e.g., 100% duty cycle). As a general matter, the floor duty cycle reference signal 115 controls the generation of the shunt current, Ishunt, and the ceiling duty cycle reference signal 305 determines when to force the PWM controller circuitry 106 to operate at a predefined (e.g., maximum) duty cycle.

Figure 4:
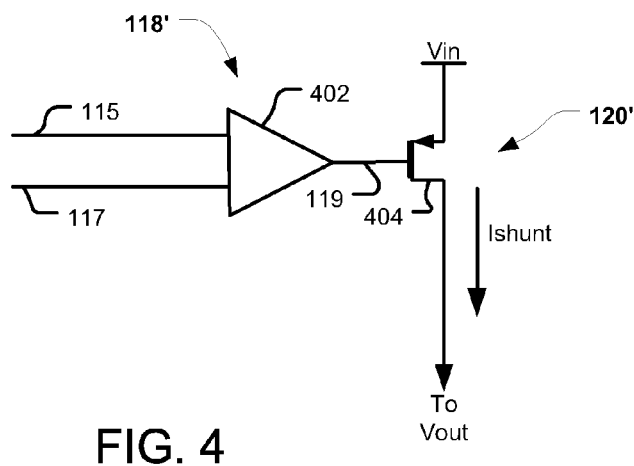
FIG. 4 illustrates shunt switch control circuitry and shunt switch circuitry according to one embodiment of the present disclosure.

FIG. 4 illustrates shunt switch control circuitry 118' and shunt switch circuitry 120' according to one embodiment of the present disclosure. This embodiment includes amplifier circuitry 402 configured to compare the first (floor) duty cycle reference signal 115 and the duty cycle measurement signal 117 to generate the switch control signal 119 to control the conduction state of the switch circuitry 120'. Thus, for example, if the first duty cycle reference signal 115 is selected to represent a 80% duty cycle of the PWM signal 107, when duty cycle measurement signal 117 exceeds the first reference signal 115, the amplifier circuitry 402 may generate a switch control signal 119 that is sufficient to cause the switch circuitry 120' to begin to conduct, thus generating the shunt current, Ishunt, delivered to the output node Vout. If the duty cycle measurement signal 117 increases, the value of the switch control signal may increase to provide a larger shunt current value. Of course, the value of 80% is provided only as an example, and in other embodiments the value of the first reference signal may be based on, for example, when the ripple parameters at the output node exceed load tolerances.

Figure 5:
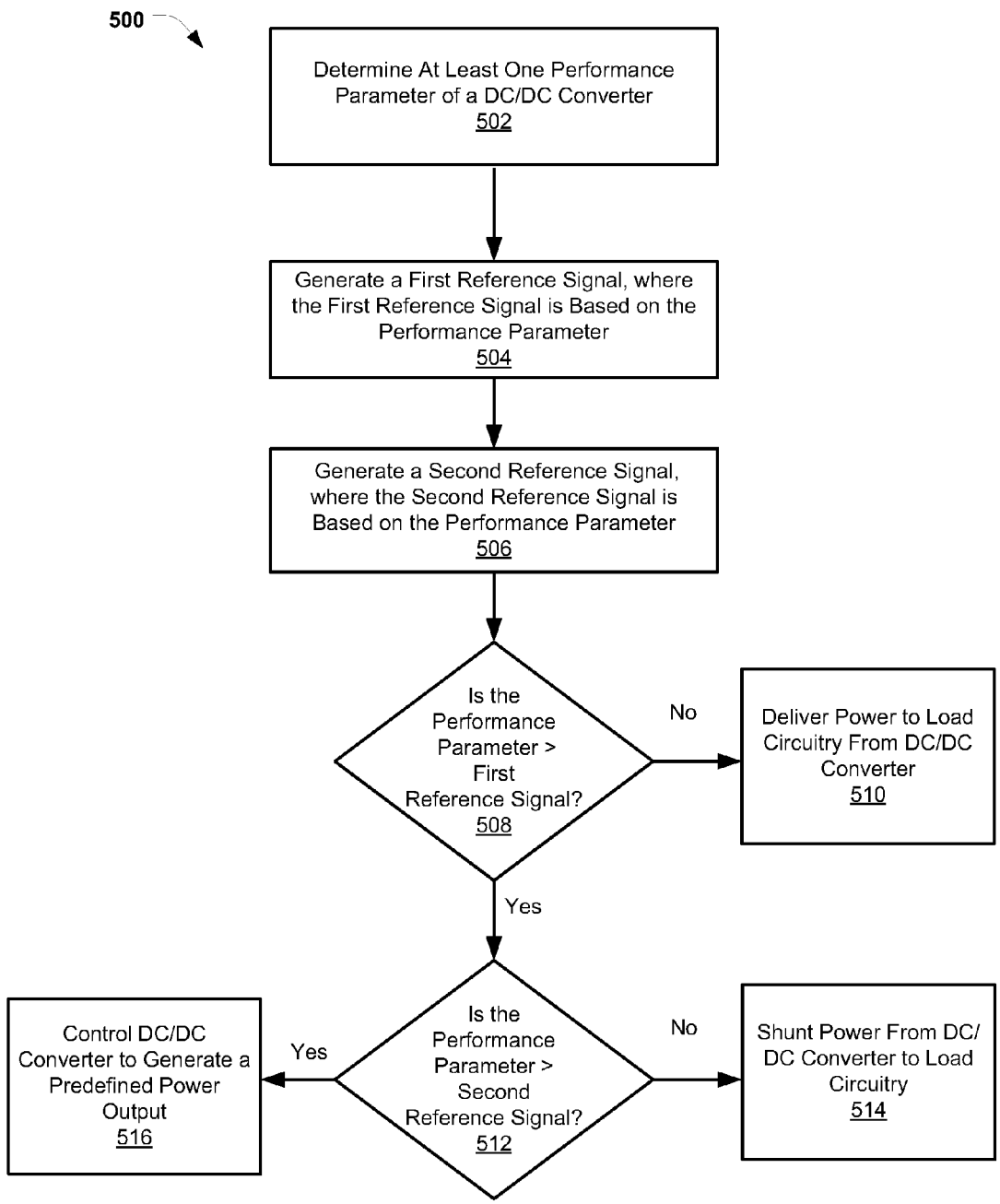
FIG. 5 illustrates a flowchart of operations consistent with one embodiment of the present disclosure.

FIG. 5 illustrates a flowchart 500 of operations consistent with one embodiment of the present disclosure. Operations of this embodiment may include determining at least one performance parameter of a DC/DC converter circuit 502. Examples of performance parameters include duty cycle, input voltage, output voltage, load current requirements, etc. Operations may also include generating a first reference signal, where the first reference signal is based on the performance parameter 504. Using duty cycle as a performance parameter example, the first reference signal may be based on the duty cycle of the DC/DC converter circuit. Operations may also include second reference signal, where the second reference signal is based on the performance parameter 506. Continuing with the example of using duty cycle as a performance parameter example, the second reference signal may be based on the duty cycle of the DC/DC converter circuit. Operations may also include determining if the performance parameter is greater than the first reference signal 508. If the performance parameter is less than the first reference signal, operations may include delivering power to load circuitry from the DC/DC converter circuit 510. If the performance parameter is greater than the first reference signal, operations may include determining if the performance parameter is greater than the second reference signal 512. If the performance parameter is less than the second reference signal, operations may include shunting power from the DC/DC converter circuit to the load circuitry 514. Shunting may include, for example, coupling an input power source to an output node of the DC/DC converter circuit so that the power supplied by the DC/DC converter circuit is reduced. If the performance parameter is greater than the second reference signal, operations may include controlling the DC/DC converter circuit to generate a predefined power output 516. While FIG. 5 illustrates various operations according to one embodiment, it is to be understood that in not all of these operations are necessary. Indeed, it is fully contemplated herein that in other embodiments of the present disclosure, the operations depicted in FIG. 5 and/or operations described elsewhere herein may be combined in a manner not specifically shown in any of the drawings, but still fully consistent with the present disclosure. Thus, claims directed to features and/or operations that are not exactly shown in one drawing are deemed within the scope and content of the present disclosure. In addition, "circuitry" or "circuit", as used in any embodiment herein, may comprise, for example, singly or in any combination, hardwired circuitry, programmable circuitry, state machine circuitry, and/or circuitry available in a larger system, for example, discrete elements that may be included as part of an integrated circuit. In addition, any of the switch devices described herein may include any type of known or after-developed switch circuitry such as, for example, MOS transistors, BJTs, SiC transistors, etc.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A power supply system, comprising:
   DC/DC converter circuitry configured to deliver power to an output node to power load circuitry coupled to the output node, the DC/DC converter circuitry comprising pulse width modulation (PWM) controller circuitry configured to generate a PWM signal having a duty cycle proportional to an amount of power delivered to the output node; and
   shunt circuitry coupled between an input power source and the output node and configured to generate a shunt current from the input power source to the output node, wherein the shunt circuitry includes:
      measurement circuitry configured to measure a duty cycle of the PWM signal and generate a signal that is proportional to the measurement of the duty cycle of the PWM signal;
      reference signal generation circuitry configured to generate a plurality of duty cycle reference signals falling between, but not inclusive of, a maximum duty cycle and a minimum duty cycle, select at least a first duty cycle reference signal and a second duty cycle reference signal from the plurality of duty cycle reference signals and control the PWM controller circuitry to generate a PWM signal having a maximum duty cycle based on a determination that the proportional signal is above the second duty cycle reference signal; and
      shunt current control circuitry configured to compare the proportional signal and the first duty cycle reference and to cause the shunt circuitry to generate an amount of shunt current based on a comparison.

2. The power supply of claim 1, wherein the first duty cycle reference signal is selected to have a value that is approximately indicative of, or approximately proportional to, a duty cycle of the PWM signal that causes a ripple parameter at the output node to exceed a ripple threshold.

3. The power supply of claim 1, wherein the shunt current is added to the power generated by the DC/DC converter circuitry at the output node.

4. The power supply of claim 1, wherein the second duty cycle reference signal is selected to have a value that is approximately indicative of, or approximately proportional to, a duty cycle of the PWM signal that causes a ripple parameter at the output node to exceed a ripple threshold.

5. The power supply of claim 1, wherein the shunt circuitry is further configured to discontinue the shunt current based on, at least in part, the determination that the proportional signal is above the second duty cycle reference.

6. The power supply system of claim 1, further comprising inductor circuitry coupled between the DC/DC converter circuitry and the output node.

7. A power supply system, comprising:
shunt circuitry coupled between an input power source and the output node and configured to generate a shunt current from the input power source to the output node, wherein the shunt circuitry includes:
  measurement circuitry configured to measure a duty cycle of the PWM signal and generate a signal that is proportional to the measurement of the duty cycle of the PWM signal;
  reference signal generation circuitry configured to generate a plurality of duty cycle reference signals falling between, but not inclusive of, a maximum duty cycle and a minimum duty cycle, select at least a first duty cycle reference signal and a second duty cycle reference signal from the plurality of duty cycle reference signals and control the PWM controller circuitry to generate a PWM signal having a maximum duty cycle based on a determination that the proportional signal is above the second duty cycle reference signal; and
  shunt current control circuitry configured to compare the proportional signal and the first duty cycle reference and to cause the shunt circuitry to generate an amount of shunt current based on a comparison.

8. The power supply of claim 7, wherein the first duty cycle reference signal is selected to have a value that is approximately indicative of, or approximately proportional to, a duty cycle of the PWM signal generated by the DC/DC converter circuit that causes a ripple parameter at the output node to exceed a ripple threshold.

9. The power supply of claim 7, wherein the second duty cycle reference signal is selected to have a value that is approximately indicative of, or approximately proportional to, a duty cycle of the PWM signal that causes a ripple parameter at the output node to exceed a ripple threshold.

10. The power supply of claim 7, wherein the shunt circuitry is further configured to discontinue the shunt current based on, at least in part, the determination that the proportional signal is above the second duty cycle reference signal.

11. A method of shunting a power supply to reduce output ripple, comprising:
  generating a signal proportional to a measurement of a duty cycle of a PWM signal generated in a DC/DC converter circuit;
  generating a plurality of reference signals, wherein the plurality of reference signals are based on a plurality of duty cycles falling between, but not inclusive of, a maximum duty cycle and a minimum duty cycle;
  selecting a first reference signal and a second reference signal;
  comparing the proportional signal to the first and second reference signals;
  causing the PWM signal to be generated with a maximum duty cycle based on a determination that the proportional signal is above the second duty cycle reference signal; and
  generating a shunt current from an input power source to an output node of the DC/DC converter circuit, wherein an amount of the shunt current generated is based on, at least in part, the comparison of the first reference signal and the proportional signal.

12. The method of claim 11, further comprising:
  discontinuing the shunt current based on, at least in part, the determination that the proportional signal is above the second duty cycle reference signal.

13. The method of claim 11, wherein the first reference signal is selected to have a value that is approximately indicative of, or approximately proportional to, a duty cycle of a PWM signal, generated by the DC/DC converter circuit, that causes a ripple parameter at the output node to exceed a ripple threshold.

14. The method of claim 11, wherein the second reference signal is selected to have a value that is approximately indicative of, or approximately proportional to, a duty cycle of a PWM signal, generated by the DC/DC converter circuit, that causes a ripple parameter at the output node to exceed a ripple threshold.

15. The power supply system of claim 1, wherein the shunt current control circuitry is to control the amount of shunt current generated by the shunt circuitry based on a determination of an amount that the proportional signal exceeds the first reference signal.

16. The power supply system of claim 7, wherein the shunt current control circuitry is to control the amount of shunt current generated by the shunt circuitry based on a determination of an amount that the proportional signal exceeds the first reference signal.

17. The method of claim 11, wherein generating the shunt current comprises controlling an amount of shunt current generated based on determining an amount that the proportional signal exceeds the first reference signal.

* * * * *

UNITED STATES PATENT AND TRADEMARK OFFICE
CERTIFICATE OF CORRECTION

PATENT NO. : 9,201,441 B2
APPLICATION NO. : 13/718143
DATED : December 1, 2015
INVENTOR(S) : Ingino, Jr. et al.

Page 1 of 1

It is certified that error appears in the above-identified patent and that said Letters Patent is hereby corrected as shown below:

On the title page item [72], delete "Ingino," and insert -- Ingino Jr., -- therefore.

Signed and Sealed this
Sixteenth Day of August, 2016

Michelle K. Lee
*Director of the United States Patent and Trademark Office*